(12) United States Patent
Wanami et al.

(10) Patent No.: US 7,526,963 B2
(45) Date of Patent: May 5, 2009

(54) PRESSURE SENSOR HAVING A PRESSURE DETECTING ELEMENT AND A CIRCUIT BOARD ON OPPOSITE SIDES OF A HOUSING

(75) Inventors: Shingo Wanami, Kariya (JP); Satoru Takehara, Obu (JP); Kouji Uchida, Kariya (JP); Taiki Katsu, Nukata-gun (JP)

(73) Assignee: Denso Corporation, Kariya (JP)

( * ) Notice: Subject to any disclaimer, the term of this patent is extended or adjusted under 35 U.S.C. 154(b) by 10 days.

(21) Appl. No.: 11/805,568

(22) Filed: May 23, 2007

(65) Prior Publication Data

US 2007/0272029 A1    Nov. 29, 2007

(30) Foreign Application Priority Data

May 24, 2006    (JP)    .............................. 2006-144184

(51) Int. Cl.
*G01L 9/00*    (2006.01)
(52) U.S. Cl. .............................. 73/753; 73/700; 73/754
(58) Field of Classification Search ........... 73/700–756; 361/283.1–283.4
See application file for complete search history.

(56) References Cited

U.S. PATENT DOCUMENTS

| | | | |
|---|---|---|---|
| 4,850,227 A | | 7/1989 | Luettgen et al. |
| 5,014,557 A | * | 5/1991 | Lawless ........................ 73/756 |
| 5,060,108 A | * | 10/1991 | Baker et al. .............. 361/283.4 |
| 6,209,398 B1 | * | 4/2001 | Fowler et al. ................. 73/724 |
| 6,651,508 B2 | | 11/2003 | Baba et al. |
| 6,813,952 B2 | | 11/2004 | Yamashita et al. |
| 6,935,184 B2 | * | 8/2005 | Kurtz ........................... 73/756 |
| 7,162,927 B1 | * | 1/2007 | Selvan et al. .................. 73/753 |
| 7,313,970 B2 | * | 1/2008 | Nonaka et al. ................. 73/756 |
| 7,426,868 B2 | | 9/2008 | Fessele et al. |

FOREIGN PATENT DOCUMENTS

| | | |
|---|---|---|
| DE | 10333964 A1 | 2/2005 |
| DE | 102004012593 | 9/2005 |
| EP | 0322122 | 6/1989 |
| JP | 63-027724 | 2/1988 |
| JP | 02-249740 | 10/1990 |
| JP | 2005-043367 | 2/2005 |

OTHER PUBLICATIONS

Office Action issued from German Patent Office dated Sep. 2, 2008 in the corresponding German Patent Application No. 102007023572.2.
Office action dated Aug. 8, 2008 in Chinese Application No. 2007 10103731.9 with English translation thereof.

* cited by examiner

Primary Examiner—Andre J. Allen
Assistant Examiner—Jermaine Jenkins
(74) Attorney, Agent, or Firm—Harness, Dickey & Pierce, PLC

(57) ABSTRACT

A pressure sensor includes a pressure detecting element for detecting a pressure, a circuit board having an electrical circuit to be connected to the pressure detecting element, and a housing having a housing member and a cover. The housing member partitions at least a part of a first space for accommodating the pressure detecting element and at least a part of a second space for accommodating the circuit board such that the first space and the second space are separated from each other. The cover partitions at least a part of a remainder of each of the first space and the second space.

13 Claims, 3 Drawing Sheets

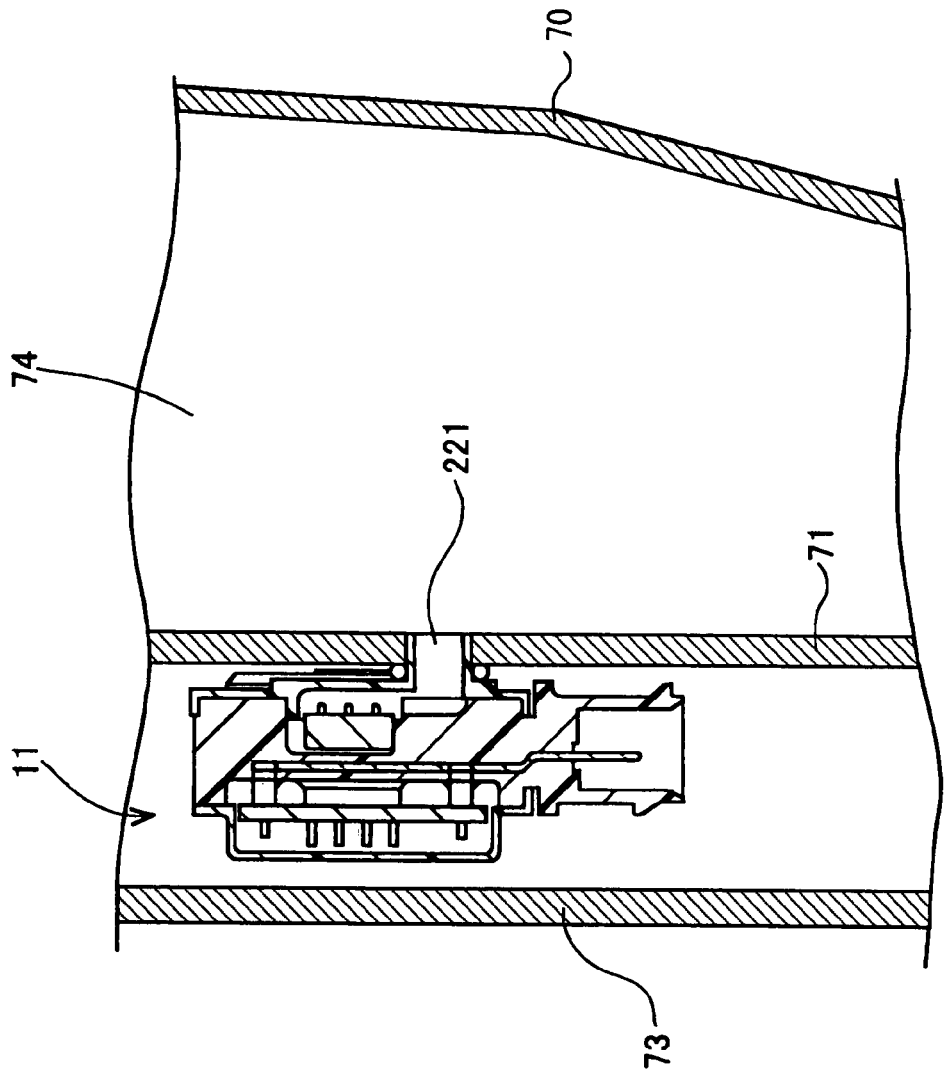
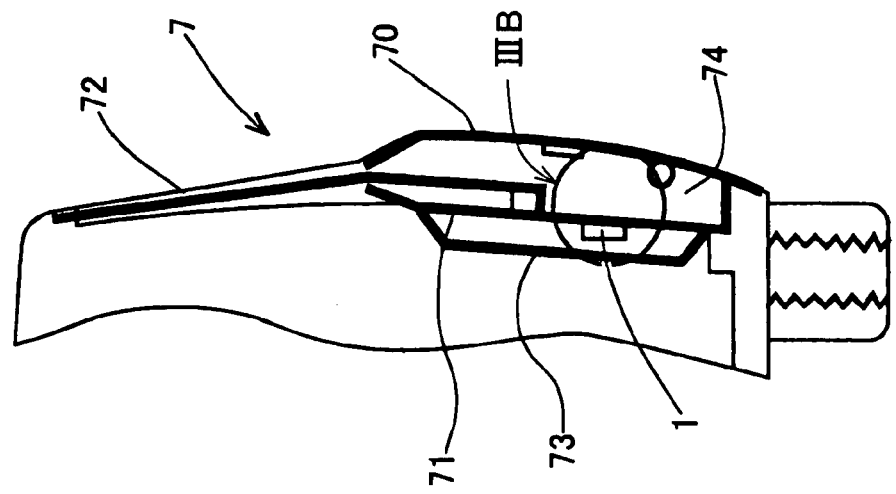
FIG. 3A
FIG. 3B

PRESSURE SENSOR HAVING A PRESSURE DETECTING ELEMENT AND A CIRCUIT BOARD ON OPPOSITE SIDES OF A HOUSING

CROSS REFERENCE TO RELATED APPLICATION

This application is based on Japanese Patent Application No. 2006-144184 filed on May 24, 2006, the disclosure of which is incorporated herein by reference in its entirety.

BACKGROUND OF THE INVENTION

1. Field of the Invention

The present invention relates to a pressure sensor.

2. Description of Related Art

An occupant restraint system is typically mounted to a vehicle, and protects an occupant when the vehicle collides with an object. For example, an air-bag device for protecting a head of the occupant by inflating an air-bag, or a pretensioner for tensioning a seatbelt is used as the occupant restraint system. The air-bag device or the pretensioner is controlled by an electrical control unit (ECU). The ECU determines collision of the vehicle based on a signal output from a sensor provided in the vehicle, and activates the occupant restraint system based on the determination.

Not only a safety for collision in a vehicle traveling direction (back- and forth direction of the vehicle) but also a safety for lateral collision in a vehicle width direction is required, recently. JP-A-2-249740 discloses a side air-bag device for protecting the occupant from the lateral collision. A pressure variation in a space is detected in order to inflate the side air-bag device. A pressure sensor detects a variation of an inner pressure inside of a door of the vehicle as the pressure variation in the space.

The pressure sensor for detecting the lateral collision includes a case and a circuit assembly. The case has an approximately hollow body, and an air passage is provided in the case in order to make inside of the case and outside of the case to communicate with each other. The circuit assembly is fixed in the case, and includes a sensor element for detecting a pressure. A rubber gasket is provided between the case and the sensor element, because a high water-resistance is required for the pressure sensor. Water can be restricted from seeping into the case except for a surface of the sensor element due to the rubber gasket disposed between the circuit assembly and the case. Thus, a circuit board of the circuit assembly can be kept dry.

However, when the rubber gasket is used in the pressure sensor, cost of the pressure sensor may be increased, because high dimensional accuracy is required for the circuit board, the sensor element and the case. Further, the rubber gasket is pressed between a detector of the circuit board and the case. That is, a stress for pressing the rubber gasket is applied to an electrical connection part between the circuit board and the sensor element. Therefore, reliability for the electrical connection part, the circuit board and the sensor element is difficult to be secured.

SUMMARY OF THE INVENTION

In view of the foregoing and other problems, it is an object of the present invention to provide a pressure sensor.

According to a first example of the present invention, a pressure sensor includes a pressure detecting element for detecting a pressure, a circuit board having an electrical circuit to be connected to the pressure detecting element, and a housing having a housing member and a cover. The housing member partitions at least a part of a first space for accommodating the pressure detecting element and at least a part of a second space for accommodating the circuit board such that the first space and the second space are separated from each other. The cover partitions at least a part of a remainder of each of the first space and the second space.

According to a second example of the present invention, a pressure sensor includes a pressure detecting element, a circuit board, a housing and an electrical connector. The pressure detecting element detects a pressure. The circuit board has an electrical circuit connected to the pressure detecting element. The housing partitions a first space for accommodating the pressure detecting element and a second space for accommodating the circuit board such that the first space and the second space are separated from each other. The electrical connector electrically connects the pressure detecting element and the circuit board, and is integrally constructed with the housing.

According to a third example of the present invention, a pressure sensor includes a pressure detecting element for detecting a pressure, and a housing having a housing member and a cover. The housing member partitions at least a part of a space for accommodating the pressure detecting element, and the cover partitions at least a part of a remainder of the space. The space is partitioned to extend along a surface of the housing member. The cover has a communication hole for making outside and the space to communicate with each other, and the communication hole is provided to be spaced from a position opposing to the pressure detecting element.

Accordingly, the pressure sensor can have a high reliability, and can be produced with a low cost.

BRIEF DESCRIPTION OF THE DRAWINGS

The above and other objects, features and advantages of the present invention will become more apparent from the following detailed description made with reference to the accompanying drawings. In the drawings:

FIG. 3A is a schematic cross-sectional view of a vehicle door in which a collision detecting system including the pressure sensor is mounted, and FIG. 3B is an enlarged view of a circle IIIB in FIG. 3A.

DETAILED DESCRIPTION OF PREFERRED EMBODIMENT

Figure 1:
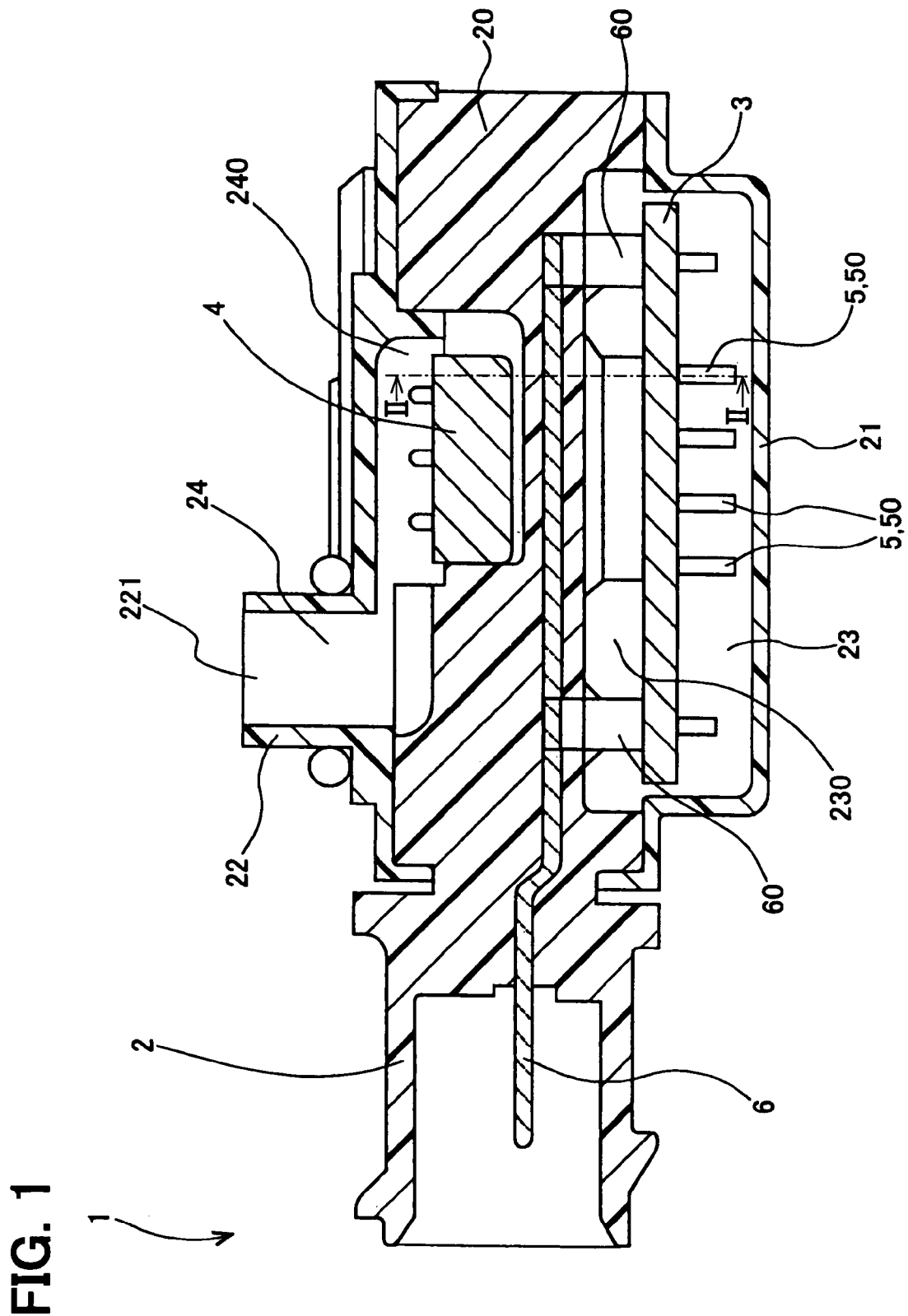
FIG. 1 is a cross-sectional view showing a pressure sensor according to an embodiment of the present invention.

As shown in FIG. 1, a pressure sensor 1 includes a housing 2, a circuit board 3 and a sensor element 4. The housing 2 is constructed with a housing member 20, a first cover 21 and a second cover 22, which are made of resin. A board space 23 and a sensor space 24 are provided in the housing 2. The board space 23 accommodates the circuit board 3, and the sensor space 24 accommodates the sensor element 4. The housing member 20 has a first recess 230 and a second recess 240. The first cover 21 covers the first recess 230, and the second cover 22 covers the second recess 240. The housing member 20 has a first face and a second face opposing to the first face. The first recess 230 is provided in the first face, and the second recess 240 is provided in the second face opposing to the first face. That is, the first recess 230 and the second recess 240 are symmetrically positioned in a thickness direction of the housing member 20. The first recess 230 has an opening in the first face of the housing member 20, and the second recess 240 has an opening in the second face opposing to the first face. A bottom face of the first recess 230 and a bottom face of the second recess 240 are approximately parallel to each other. Each side face of the first recess 230 and the second recess 240 is approximately perpendicular to the bottom faces of the first recess 230 and the second recess 240.

Figure 2:
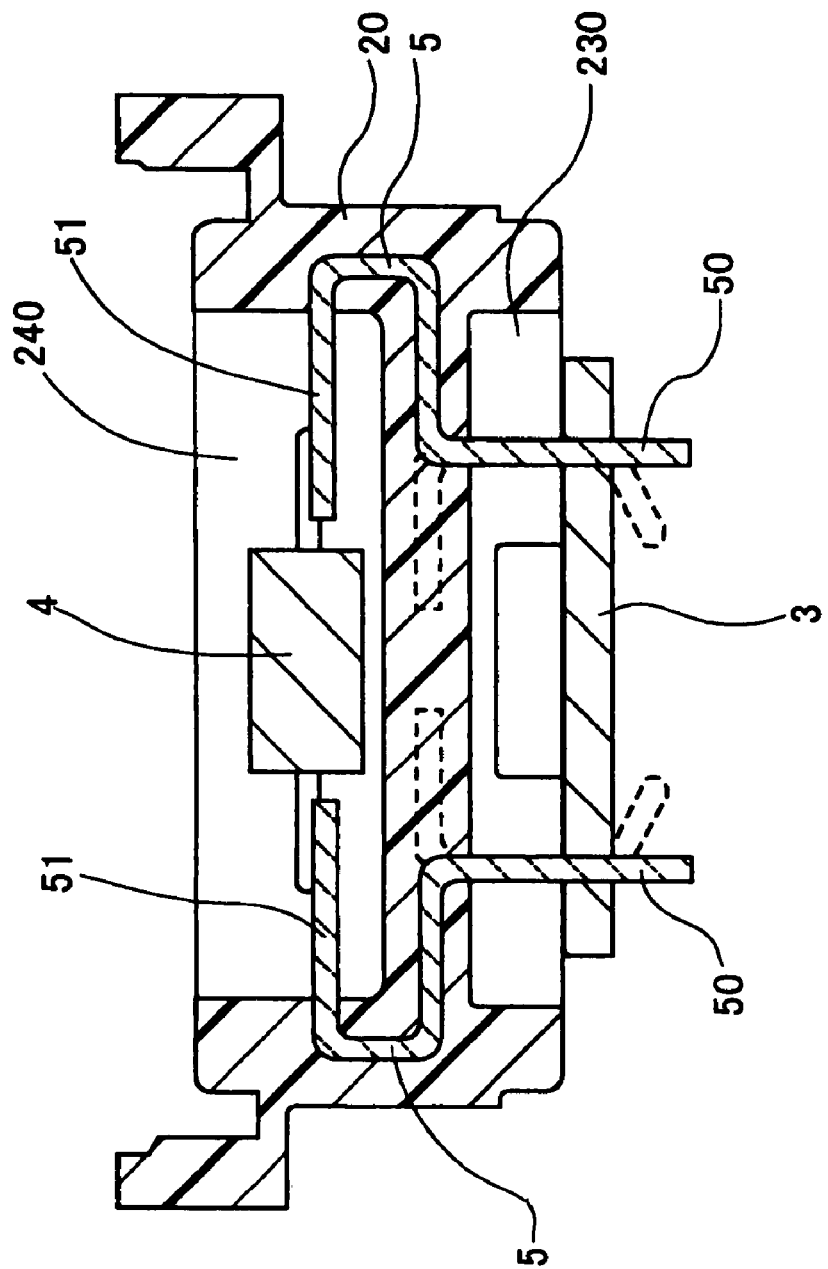
FIG. 2 is a cross-sectional view showing the pressure sensor taken along line II-II in FIG. 1.

As shown in FIG. 2, a terminal 5 is integrally constructed with the housing member 20, and first and second end portions 50, 51 of the terminal 5 protrude in the first recess 230 and the second recess 240, respectively. The terminal 5 extends in a direction connecting the first recess 230 and the second recess 240. The first end portion 50 protrudes in the board space 23 through the bottom face of the first recess 230, and the second end portion 51 protrudes in the sensor space 24 through the side face of the second recess 240. The second end portion 51 extends parallel to the bottom face of the second recess 240, and the first end portion 50 protrudes from the opening of the first recess 230.

Further, as shown in FIG. 1, an external terminal 6 is integrally constructed with the housing member 20. The pressure sensor 1 and an outside calculation device (not shown) communicate with each other through the external terminal 6. A first end portion of the terminal 6 protrudes from the housing 2, and a second end portion 60 of the terminal 6 protrudes in the first recess 230, which partitions the board space 23. The second end portion 60 of the terminal 6 protrudes from the opening of the first recess 230, and a diameter of the protruding part is stepwise made smaller than that of a base part of the second end portion 60.

The housing member 20 is molded into a predetermined shape by an insert molding in which resin is injected in a state that the terminal 5 and the external terminal 6 are located in a mold.

The first cover 21 is fixed to the housing member 20 to cover the first recess 230, and the board space 23 is formed between the first cover 21 and the housing member 20. The first cover 21 has a side face approximately parallel to the side face of the first recess 230, and a bottom face approximately perpendicular to the side face. That is, the first cover 21 has an approximately tube shape with the bottom face. The bottom face of the first cover 21 is spaced from the opening of the first recess 230 of the housing member 20.

The second cover 22 is fixed to the housing member 20 to cover the second recess 240, and the sensor space 24 is formed between the second cover 22 and the housing member 20. The sensor space 24 has an approximately crank-shape part in its cross-section. A center part of the crank-shape part of the sensor space 24 extends along a surface of the housing member 20 (opening of the second recess 240). A first end portion of the center part extends inside of the housing member 20 so as to form a first crank, and a second end portion of the center part extends outward so as to form a second crank. Each of the first crank and the second crank extends approximately parallel to the terminal 5, and the sensor element 4 is fixed in the first crank.

Further, the terminal 5 protrudes in the first crank of the sensor space 24. The first crank of the sensor space 24 is defined by the housing member 20, and the second crank of the sensor space 24 is defined by the second cover 22. A through hole 221 is provided in the second crank of the sensor space 24, and passes through the second cover 22. That is, the sensor space 24 is formed along the surface of the housing member 20, and the through hole 221 is provided in the second cover 22 opposing to a position spaced from the sensor element 4. Specifically, the second cover 22 is constructed with a main body covering the second recess 240, and a tube part protruding from the main body. The tube part partitions the second crank of the sensor space 24. The main body has an inner face opposing to the housing member 20.

Each of the first cover 21 and the second cover 22 is produced by molding by using resin to have a simple structure, so that its removal from a molding die can be easily performed after the molding. That is, a cost for producing the cover 21, 22 can be restricted from increasing.

Each of the first cover 21 and the second cover 22 is fixed to the housing member 20 by a laser adhesion or adhesive, for example. In this embodiment, all periphery of a contact part between the cover 21, 22 and the housing member 20 is welded or bonded in order to secure a sealing property, e.g., air-tightness or liquid-tightness.

The sensor element 4 detects a pressure, and may be any kind of element capable of detecting the pressure. A known pressure sensor may be used as the sensor element 4. In this embodiment, a diaphragm type pressure sensor is used as the sensor element 4.

An element for performing necessary control is disposed on the circuit board 3 such that the sensor element 4 detects the pressure. Further, a calculating device (not shown) for calculating the pressure based on detection signal output from the sensor element 4, and an interface (not shown) for sending pressure signal to outside are disposed on the circuit board 3.

The sensor element 4 and the circuit board 3 are connected to each other through the terminal 5. Further, the circuit board 3 is connected to the external terminal 6.

The circuit board 3 is inserted into the first recess 230, and is fixed to the terminal 5 by connecting. The sensor element 4 is inserted into the second recess 240, and is fixed to the terminal 5 by connecting. Here, the first end portion 50 of the terminal 5 protrudes in the first recess 230 of the housing member 20, and the second end portion 51 of the terminal 5 protrudes in the second recess 240 of the housing member 20. Therefore, the circuit board 3 can be arranged at a predetermined position by being guided by the first end portion 50, and the sensor element 4 can be arranged at a predetermined position by being guided by the second end portion 51. That is, the terminal 5 guides the circuit board 3 and the sensor element 4, because the terminal 5 is integrally constructed with the housing member 20. Therefore, dimensional accuracy of the terminal 5 can be easily secured, and the circuit board 3 and the sensor element 4 can be easily assembled.

Thereafter, the circuit board 3 is connected to the first end portion 50 of the terminal 5, and the sensor element 4 is connected to the second end portion 51 of the terminal 5. Thus, the circuit board 3 can be fixed at the predetermined position, and the sensor element 4 can be fixed at the predetermined position. At this time, the circuit board 3 is positioned in a state that the first end portion 50 of the terminal 5 passes through the circuit board 3, and the terminal 5 and the circuit board 3 are soldered to be connected to each other in the state.

In addition, due to the above-described shape of the second end portion 60 of the external terminal 6, the circuit board 3 is engaged with the second end portion 60 at a position protruding from the opening of the first recess 230. Therefore, the housing member 20 does not interfere with a soldering tool when the soldering is performed. That is, the circuit board 3 can be easily soldered to the terminal 5. Further, connection state can be easily checked and inspected after the soldering. The circuit board 3 and the terminal 5 are soldered in the state that the first end portion 50 of the terminal 5 passes through the circuit board 3, as shown of a solid line in FIG. 2. However, the first end portion 50 of the terminal 5 may be bent after passing through the circuit board 3, then, the circuit board 3 and the terminal 5 may be soldered, as shown of a dashed line in FIG. 2.

Here, after the first end portion 50 of the terminal 5 passes through the circuit board 3, the circuit board 3 is engaged with the second end portion 60 of the external terminal 6 at the stepwise part. Thus, the circuit board 3 can be hold at the position protruding from the opening of the first recess 230.

According to the embodiment, the pressure sensor 1 has the sensor space 24 accommodating the sensor element 4 for detecting pressure, and the board space 23 accommodating the circuit board 3 for driving the sensor element 4. The housing member 20 partitions the board space 23 and the sensor space 24. The circuit board 3 and the sensor element 4 are disposed in the board space 23 and the sensor space 24, respectively, such that stress is not applied to the circuit board 3 and the sensor element 4. That is, because unnecessary stress is not applied to the circuit board 3 and the sensor element 4, stress concentration to the circuit board 3 and the sensor element 4 can be reduced. Thus, the pressure sensor 1 can have a high reliability.

The pressure sensor 1 includes the sensor element 4 for detecting a pressure, the circuit board 3 having an electrical circuit to be connected to the sensor element 4, and the housing 2 having the housing member 20 and the cover 21, 22. The housing member 20 partitions at least a part of the sensor space 24 for accommodating the sensor element 4 and at least a part of the board space 23 for accommodating the circuit board 3 such that the sensor space 24 and the board space 23 are separated from each other. The cover 21, 22 partitions at least a part of a remainder of each of the sensor space 24 and the board space 23.

The sensor space 24 and the board space 23 are partitioned to be separated (independent) from each other. Water-resistance can be secured in each of the spaces 23, 24, so that water-resistance of the sensor element 4 and water-resistance of the circuit board 3 can be secured. The pressure sensor 1 does not include a rubber gasket between the sensor element 4 and the housing 2. Therefore, positioning accuracy required for the pressure sensor 1 can be made lower. Further, because stress is not applied to the sensor element 4, stress concentration can be reduced. Thus, the pressure sensor 1 can have a high reliability, and can be made with a low cost.

Further, the board space 23 is formed in the first face of the housing member 20, and the sensor space 24 is formed in the second face opposing to the first face. Therefore, a size of the pressure sensor 1 can be restricted from increasing. Further, the terminal 5 can be made shorter. Furthermore, the pressure sensor 1 can be simply produced, because a special process is not needed in producing the pressure sensor 1.

The sensor element 4 is disposed at a position extending from the circuit board 3 in a circuit board thickness direction such that a pressure-receiving face of the sensor element 4 is approximately parallel to the circuit board 3. The sensor element 4 opposes to the circuit board 3 through the housing member 20 in the circuit board thickness direction. Therefore, the board space 23 is formed in the first face of the housing member 20, and the sensor space 24 is formed in the second face opposing to the first face. Thus, a size of the pressure sensor 1 can be reduced. Further, the sensor element 4 and the circuit board 3 are connected to each other through the terminal 5 passing through the housing member 20. Thus, the terminal 5 can be made shorter.

The board space 23 is constructed with the recess 230 provided in the housing member 20, and the cover 21 for covering the recess 230. The board space 23 accommodates the circuit board 3 such that a surface of the circuit board 3 protrudes from an opening of the recess 230. Therefore, the circuit board 3 can be easily assembled in the pressure sensor 1.

Next, advantage of the pressure sensor 1 will be described by using the pressure sensor 1 for a collision detection system and an occupant restraint system. The collision detection system is a part of an occupant restraint apparatus. Specifically, the collision detection system detects a lateral collision, in order to inflate a side air-bag for protecting an occupant in the lateral collision.

As shown in FIG. 3A, the pressure sensor 1 of the collision detection system is arranged in a door 7 of a vehicle. When the vehicle has the lateral collision, the door 7 is deformed. The deformation of the door 7 causes a pressure variation inside of the door 7. The pressure sensor 1 detects the pressure variation, so that the collision detection system detects the lateral collision. When the collision detection system detects the lateral collision, the collision detection system activates the side air-bag, i.e., occupant restraint apparatus.

The pressure sensor 1 is mounted inside of the door 7 such that the center part of the crank-shape part of the sensor space 24 extends in a vertical direction and that the first crank and the second crank extends in a vehicle width direction. That is, the housing longitudinal direction corresponds to the vertical direction, and the housing thickness direction corresponds to the vehicle width direction.

The door 7 of the vehicle includes an outer panel 70, an inner panel 71, a window glass 72 and a door trim 73. The outer panel 70 forms a part of an outer surface of the vehicle, and the inner panel 71 forms an inner surface of a vehicle compartment. An approximately enclosed space 74 is provided between the outer panel 70 and the inner panel 71. An inside of the door 7 and an outside of the door 7 slightly communicate with each other through the enclosed space 74. When a pressure of the outside of the door 7 is varied, a pressure of the inside of the door 7 is also varied. When an inner volume of the enclosed space 74 is rapidly decreased, an inner pressure of the enclosed space 74 is increased. The door trim 73 is disposed at the vehicle compartment side of the inner panel 71. The pressure sensor 1 is mounted in a space between the inner panel 71 and the door trim 73.

As shown in FIG. 3B, the inner panel 71 has a communication hole for making the enclosed space 74 and the vehicle compartment to communicate with each other. The pressure sensor 1 is mounted such that the through hole 221 of the cover 22 is inserted in to the communication hole of the inner panel 71. Thus, the pressure sensor 1 can measure a pressure in the enclosed space 74.

Next, collision detection by the collision detection system will be described. When an object collides with the door 7 of the vehicle, the object contacts the outer panel 70 and presses the outer panel 70 toward the vehicle compartment. Thereby, the outer panel 70 is deformed to protrude toward the inner panel 71. Because a stress of the collision is not directly applied to the inner panel 71, a shape of the inner panel 71 is not deformed for a predetermined time period after the collision. Therefore, when the outer panel 70 is deformed, a volume of the enclosed space 74 in the door 7 is rapidly decreased. When the volume of the enclosed space 74 is rapidly decreased, a pressure of the enclosed space 74 is increased. Because the enclosed space 74 is formed not to follow the rapid variation of the inner pressure, the pressure of the enclosed space 74 is increased, although the enclosed space 74 slightly communicates with the outside of the door 7. Then, the pressure of the enclosed space 74 is measured by the pressure sensor 1.

When the pressure of the enclosed space 74 of the door 7 is increased, a pressure adjacent to the pressure sensor 1 is also increased. Because the pressure sensor 1 has the through hole 221, pressure is transmitted from the enclosed space 74 into the sensor space 24 through the through hole 221. Thus, the pressure of the sensor space 24 is increased. The increased pressure is applied to the sensor element 4, and the sensor element 4 detects the increased pressure. The sensor element 4 transmits the detection result to the circuit board 3 through the terminal 5. An electrical element disposed in the circuit board 3 measures the pressure based on the detection result. The measured pressure signal is sent to an electrical control unit (ECU) of the side air-bag through the external terminal 6. The ECU determines that the collision is happened or not based on the pressure signal. When the ECU determines that the collision is happened, the ECU inflates the side air-bag.

The pressure sensor 1 is mounted in the door 7 of the vehicle such that the center part of the crank-shape part of the sensor space 24 extends in the vertical direction. Therefore, if a foreign object, e.g., water or dust, enters the enclosed space 74 of the door 7, the foreign object cannot enter the sensor space 24. Further, if the foreign object enters the sensor space 24 through the through hole 221, the foreign object is excluded due to a gravity force applied to the foreign object. Thus, the foreign object cannot reach the sensor element 4.

The sensor space 24 is partitioned by the housing member 20 and the cover 22. The sensor space 24 has the crank-shape part, so that the foreign object cannot directly adhere onto the sensor element 4. Further, the communication hole 221 is provided in the cover 22 such that the sensor element 4 is disabled to be visually recognized through the communication hole 221. If the foreign object enters the sensor space 24 through the communication hole 221, the foreign object cannot approach the sensor element 4.

The pressure sensor 1 can be produced with a low cost, and have a better reliability. The collision detection system can be made with a low cost, and have a better reliability, because the pressure sensor 1 is used in the collision detection system.

Such changes and modifications are to be understood as being within the scope of the present invention as defined by the appended claims.

What is claimed is:

1. A pressure sensor comprising:
    a pressure detecting element for detecting a pressure;
    a circuit board having an electrical circuit connected to the pressure detecting element; and
    a housing including
        a housing member for partitioning at least a part of a first space for accommodating the pressure detecting element and at least a part of a second space for accommodating the circuit board such that the first space and the second space are separated from each other, and
        a cover for partitioning at least a part of a remainder of each of the first space and the second space, wherein
    the pressure detecting element is disposed opposite to the circuit board through the housing in a direction of a thickness of the circuit board.

2. The pressure sensor according to claim 1, wherein the pressure detecting element is disposed such that a pressure-receiving face of the pressure detecting element is approximately parallel to the circuit board.

3. The pressure sensor according to claim 1, wherein
    the second space is constructed with a recess provided in the housing member, and the cover for covering the recess, and
    the second space accommodates the circuit board such that a surface of the circuit board protrudes from an opening of the recess.

4. The pressure sensor according to claim 1, wherein
    the pressure detecting element measures a pressure in a door of a vehicle.

5. The pressure sensor according to claim 1, wherein
    the cover seals a recess provided in the housing member such that the second space is an approximately enclosed space to have a water-resistance.

6. A pressure sensor comprising:
    a pressure detecting element for detecting a pressure;
    a circuit board having an electrical circuit connected to the pressure detecting element;
    a housing for partitioning a first space for accommodating the pressure detecting element and a second space for accommodating the circuit board such that the first space and the second space are separated from each other; and
    an electrical connector for electrically connecting the pressure detecting element and the circuit board, wherein
    the electrical connector is integrally constructed with the housing, and
    the pressure detecting element is disposed opposite to the circuit board through the housing in a direction of a thickness of the circuit board.

7. The pressure sensor according to claim 6, wherein the pressure detecting element is disposed such that a pressure-receiving face of the pressure detecting element is approximately parallel to the circuit board.

8. The pressure sensor according to claim 6, wherein
    the second space is constructed with a recess provided in the housing, and a cover for covering the recess, and
    the second space accommodates the circuit board such that a surface of the circuit board protrudes from an opening of the recess.

9. The pressure sensor according to claim 6, wherein
    the pressure detecting element measures a pressure in a door of a vehicle.

10. The pressure sensor according to claim 8, wherein
    the cover seals the recess provided in the housing such that the second space is an approximately enclosed space to have a water-resistance.

11. The pressure sensor according to claim 1, wherein:
    the first space is partitioned to extend along a surface of the housing member, and
    the cover has a communication hole for making outside and the first space to communicate with each other, and the communication hole is provided to be spaced from a position opposing the pressure detecting element.

12. The pressure sensor according to claim 11, wherein
    the communication hole is provided at a position such that the pressure detecting element is disabled to be visually recognized through the communication hole.

13. The pressure sensor according to claim 11, wherein
    the pressure detecting element measures a pressure in a door of a vehicle.

* * * * *